(12) United States Patent
Kudoh

(10) Patent No.: US 9,766,423 B2
(45) Date of Patent: Sep. 19, 2017

(54) LENS UNIT HAVING A PLURALITY OF PLASTIC LENSES, AND OPTICAL DEVICE

(71) Applicant: CANON KABUSHIKI KAISHA, Tokyo (JP)

(72) Inventor: Tomoyuki Kudoh, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/945,624

(22) Filed: Nov. 19, 2015

(65) Prior Publication Data

US 2016/0147033 A1    May 26, 2016

(30) Foreign Application Priority Data

Nov. 21, 2014    (JP) .................................. 2014-236350

(51) Int. Cl.
*G02B 9/04*    (2006.01)
*G02B 7/02*    (2006.01)
*G02B 7/08*    (2006.01)

(52) U.S. Cl.
CPC ............. *G02B 7/021* (2013.01); *G02B 7/022* (2013.01); *G02B 7/08* (2013.01)

(58) Field of Classification Search
CPC ..................................................... G02B 7/021
USPC ........................................................ 359/793
See application file for complete search history.

(56) References Cited

U.S. PATENT DOCUMENTS

| 4,959,183 | A | 9/1990 | Jameson |
| 6,819,508 | B2 | 11/2004 | Chiang |
| 2002/0097508 | A1 | 7/2002 | Wada et al. |
| 2005/0264898 | A1 | 12/2005 | Kuchimaru |
| 2008/0225410 | A1* | 9/2008 | Ning ................... A61B 1/00096 359/782 |
| 2012/0218651 | A1* | 8/2012 | Onishi .................... H02N 2/025 359/824 |

(Continued)

FOREIGN PATENT DOCUMENTS

| CN | 101093268 A | 12/2007 |
| JP | 2004085929 A | 3/2004 |

(Continued)

OTHER PUBLICATIONS

Nov. 22, 2016 Taiwanese Office Action, enclosed without an English Translation, that issued in Taiwanese Patent Application No. 104138120.

*Primary Examiner* — James Jones
(74) *Attorney, Agent, or Firm* — Cowan, Liebowitz & Latman, P.C.

(57) ABSTRACT

A lens unit which is capable of efficiently combining a plurality of plastic lenses, which are small, easy to assemble, and inexpensive, and holding them with high accuracy without increasing the outer diameter of the lens unit. A first lens and a second lens are made of plastic, and the second lens is fitted and held on a rear side of the first lens in a direction of an optical axis. A gate for use in molding the second lens is disposed on a cut surface formed by cutting out a part of an outer periphery of the second lens, and a convex portion corresponding in shape to a remaining part of the gate after molding of the second lens is disposed in a space between an inner peripheral surface of a portion of the first lens in which the second lens is fitted and held and the cut surface.

8 Claims, 10 Drawing Sheets

(56) References Cited

U.S. PATENT DOCUMENTS

2015/0323708 A1\* 11/2015 Hashimoto ............ G02B 7/021
   359/718

FOREIGN PATENT DOCUMENTS

| TW | 200903067 A | 1/2009 |
| TW | 200951527 A | 12/2009 |

\* cited by examiner

LENS UNIT HAVING A PLURALITY OF PLASTIC LENSES, AND OPTICAL DEVICE

BACKGROUND OF THE INVENTION

Field of the Invention

The invention relates to a lens unit and an optical device such as a digital camera, which is equipped with the lens unit.

Description of the Related Art

Lens barrels mounted in optical devices such as digital cameras include a zoom type which changes shooting magnifications by moving a plurality of lenses constituting a shooting optical system in a direction of an optical axis between a retracted position and a shooting position. Lens barrels of the zoom type are required to move the plurality of lenses in the direction of the optical axis while holding the plurality of lenses in a rotation-inhibited state with high accuracy.

Due to a recent demand for reducing the cost of cameras, lens barrels having plastic lenses in place of glass lenses are increasingly used. On the other hand, as cameras are increasingly downsized, a technique to efficiently combine a plurality of plastic lenses, which are small, easy to assemble, and inexpensive, and hold them with high accuracy is required.

Examples of conventional lens holding structures include a proposed structure in which an outer periphery of a glass lens is fitted and held in a concave portion, which is formed in a plastic lens, in a direction of an optical axis (the specification of U.S. Pat. No. 6,819,508). Also, there has been proposed a structure in which a tapering convex portion formed in one of two plastic lenses is fitted and held in a tapering concave portion, which is formed in the other one, in a direction of an optical axis (the publication of U.S. Pat. No. 4,959,183).

According to the specification of U.S. Pat. No. 6,819,508 stated above, however, the lens fitted into the concave portion formed in the plastic lens is made of glass, and no mention is made of how to deal with a gate for use in molding of the plastic lens.

Moreover, according to the publication of U.S. Pat. No. 4,959,183 stated above, for each of the two plastic lenses, a flange portion is provided over the whole circumference of a fitting portion on an outer side in a radial direction, and a gate is disposed in this flange portion. This increases the outer diameters of the plastic lenses accordingly to bring about an increase in the size of the lens barrel.

SUMMARY OF THE INVENTION

The invention provides a lens unit and an optical device which are capable of efficiently combining a plurality of plastic lenses, which are small, easy to assemble, and inexpensive, and holding them with high accuracy without the need to increase the outer diameter of the lens unit.

Accordingly, the invention provides a lens unit comprising a first lens configured to be made of plastic, a second lens configured to be fitted onto and held on a rear side of the first lens in a direction of an optical axis and made of plastic, and a lens holder configured to be disposed on a rear side of the second lens and hold the second lens, wherein a gate for use in molding the second lens is disposed on a cut surface formed by cutting out a part of an outer periphery of the second lens, and a convex portion corresponding in shape to a remaining part of the gate after molding of the second lens is disposed in a space between an inner peripheral surface of a fitting holding portion of the first lens in which the second lens is fitted and held and the cut surface.

According to the invention, the gate for use in molding the second lens is disposed on the cut surface formed by cutting out a part of the outer periphery of the second lens, and the convex portion corresponding in shape to a remaining part of the gate after molding of the second lens is disposed in the space between the inner peripheral surface of the portion of the first lens in which the second lens is fitted and held and the cut surface. As a result, a plurality of plastic lenses, which are small, easy to assemble, and inexpensive are efficiently combined together and held with high accuracy without the need to increase the outer diameter of the lens unit.

Further features of the invention will become apparent from the following description of exemplary embodiments (with reference to the attached drawings).

DESCRIPTION OF THE EMBODIMENTS

The invention will now be described with reference to the drawings showing embodiments thereof.

Figure 1A:
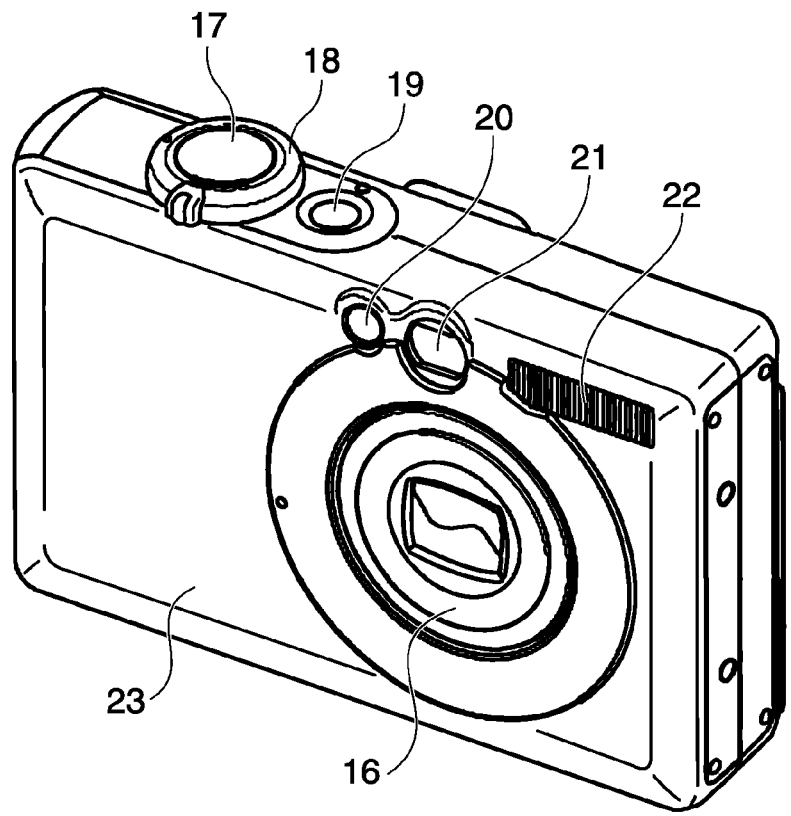
FIG. 1A is a perspective view of a digital camera, which is a first embodiment of an optical device equipped with a lens barrel which is an exemplary lens unit according to the invention, as seen from front.
Figure 1B:
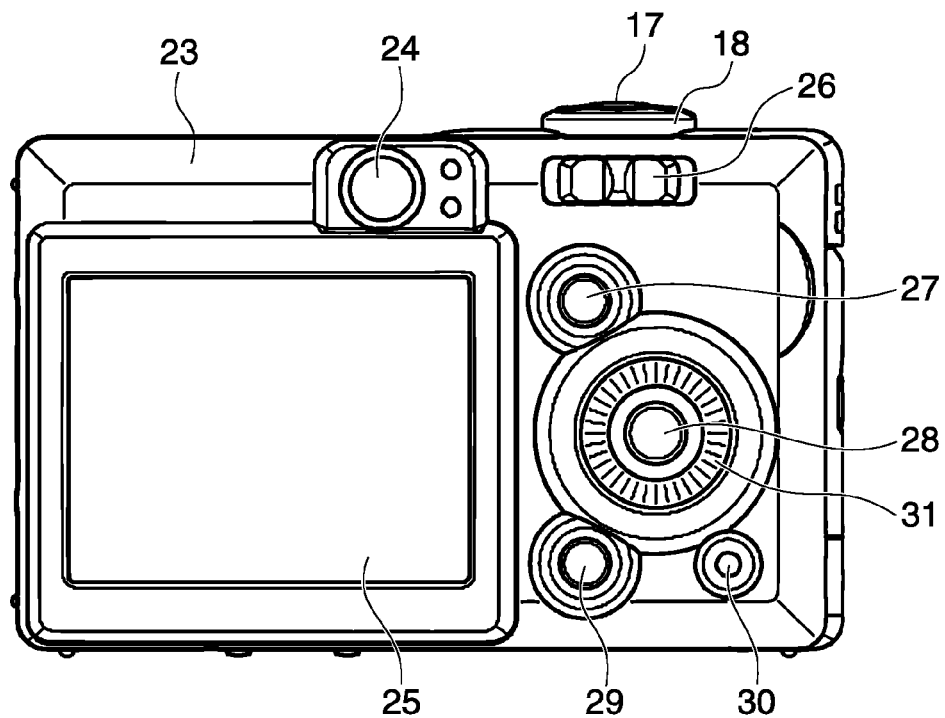
FIG. 1B is a view of the digital camera in FIG. 1A as seen from behind.

FIG. 1A is a perspective view showing a digital camera which is a first embodiment of an optical device equipped with a lens barrel which is an exemplary lens unit according to the invention as seen from front (object side), and FIG. 1B is a view showing the digital camera in FIG. 1A as seen from behind.

Referring to FIG. 1A, the digital camera 23 according to the present embodiment has, on a front side thereof, a finder 21 through which a composition for an object is determined, an auxiliary light source 20 for use in making photometric measurements/distance measurements, a stroboscopic device 22, and a lens barrel 16. The lens barrel 16 is configured to be of a zoom type which changes shooting magnifications by moving a plurality of lenses, which constitute a shooting optical system in a direction of an optical axis, between a retracted position and a shooting position.

A release button 17, a power selection button 19, and a zoom switch 18 are provided on an upper side of the digital camera 23. As shown in FIG. 1B, operating buttons 26 to 31, a display 25 such as an LCD, and a finder eyepiece 24 are provided on a rear side of the digital camera 23.

Figure 2:
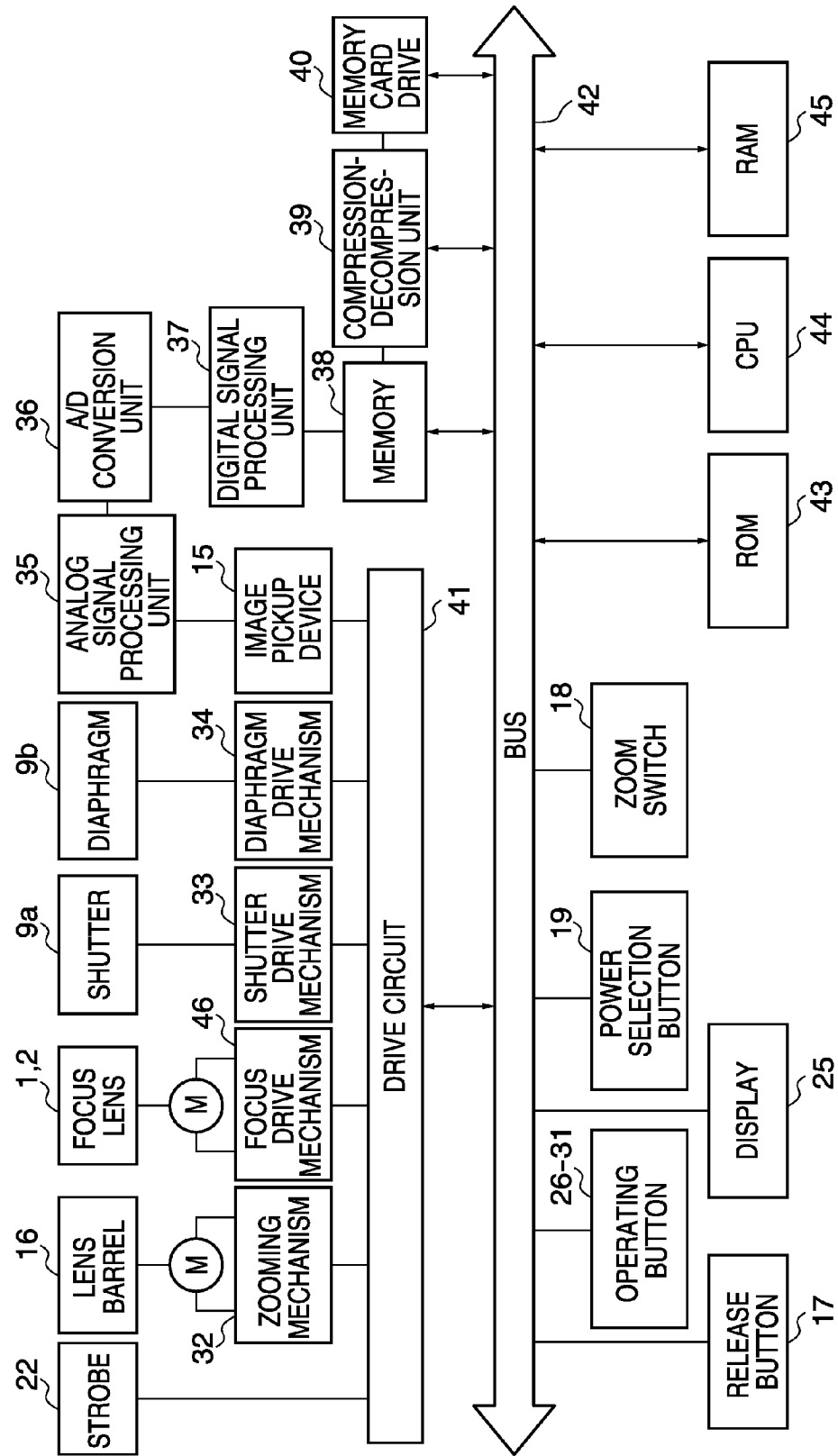
FIG. 2 is a control block diagram showing the digital camera in FIGS. 1A and 1B.

FIG. 2 is a control block diagram showing the digital camera 23 in FIGS. 1A and 1B. Connected to a bus 42 are a CPU 44, a ROM 43, a RAM 45, the release button 17, the operating buttons 26 to 31, the display 25, the power selection button 19, the zoom switch 18, a memory 38, a compression-decompression unit 39, a memory card drive 40, and a drive circuit 41.

Connected to the drive circuit 41 are a zooming mechanism 32 which zoom-drives the lens barrel 16, a focus drive mechanism 46 which drives a focus lens group 1, 2, a shutter drive mechanism 33 which drives a shutter 9a, and a diaphragm drive mechanism 34 which drives a diaphragm 9b. An image pickup device 15 such as a CCD sensor or a CMOS sensor and the stroboscopic device 22 are also connected to the drive circuit 41. Operation of the units connected to the drive circuit 41 is controlled through the drive circuit 41 based on signals from the CPU 44.

Various control programs and others are stored in the ROM 43, and data required for various control programs is stored in the RAM 45. An analog signal processing unit 35 performs analog processing on image data output from the image pickup device 15 and outputs the image data to an A/D conversion unit 36.

The A/D conversion unit 36 converts analog data, which has been subjected to processing by the analog signal processing unit 35, into digital data and outputs the digital data to a digital signal processing unit 37. The digital signal processing unit 37 performs predetermined processing on digital data obtained as a result of conversion by the A/D conversion unit 36 and outputs the digital data as image data to the memory 38.

Image data stored in the memory 38 is subjected to a compression process such as JPEG or TIFF by the compression-decompression unit 39 and then output to and stored in a memory card inserted in the memory card drive 40.

Image data stored in the memory 38 and image data stored in the memory card drive 40 are also allowed to be subjected to a decompression process by the compression-decompression unit 39 and then displayed on the display 25 via the bus 42.

Figure 3:
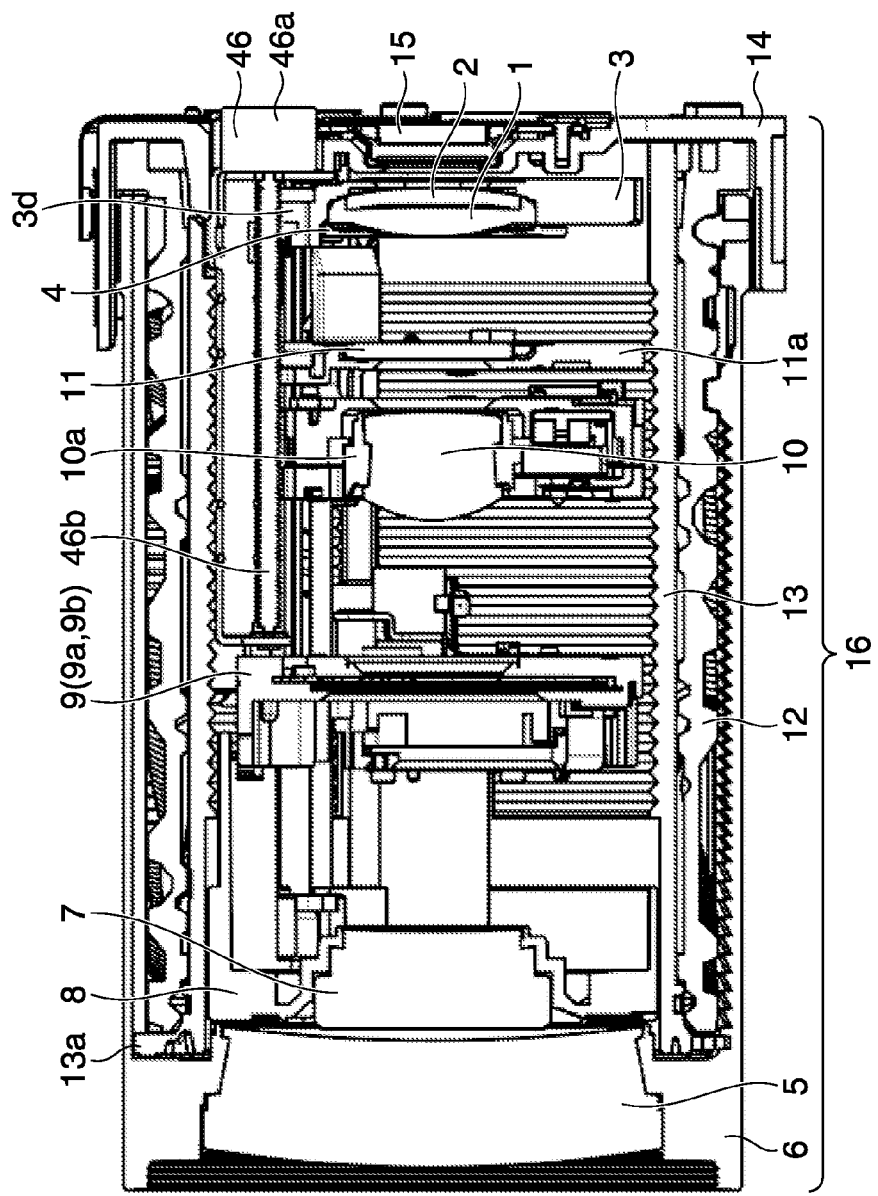
FIG. 3 is a cross-sectional view showing the lens barrel at a retracted position.
Figure 4:
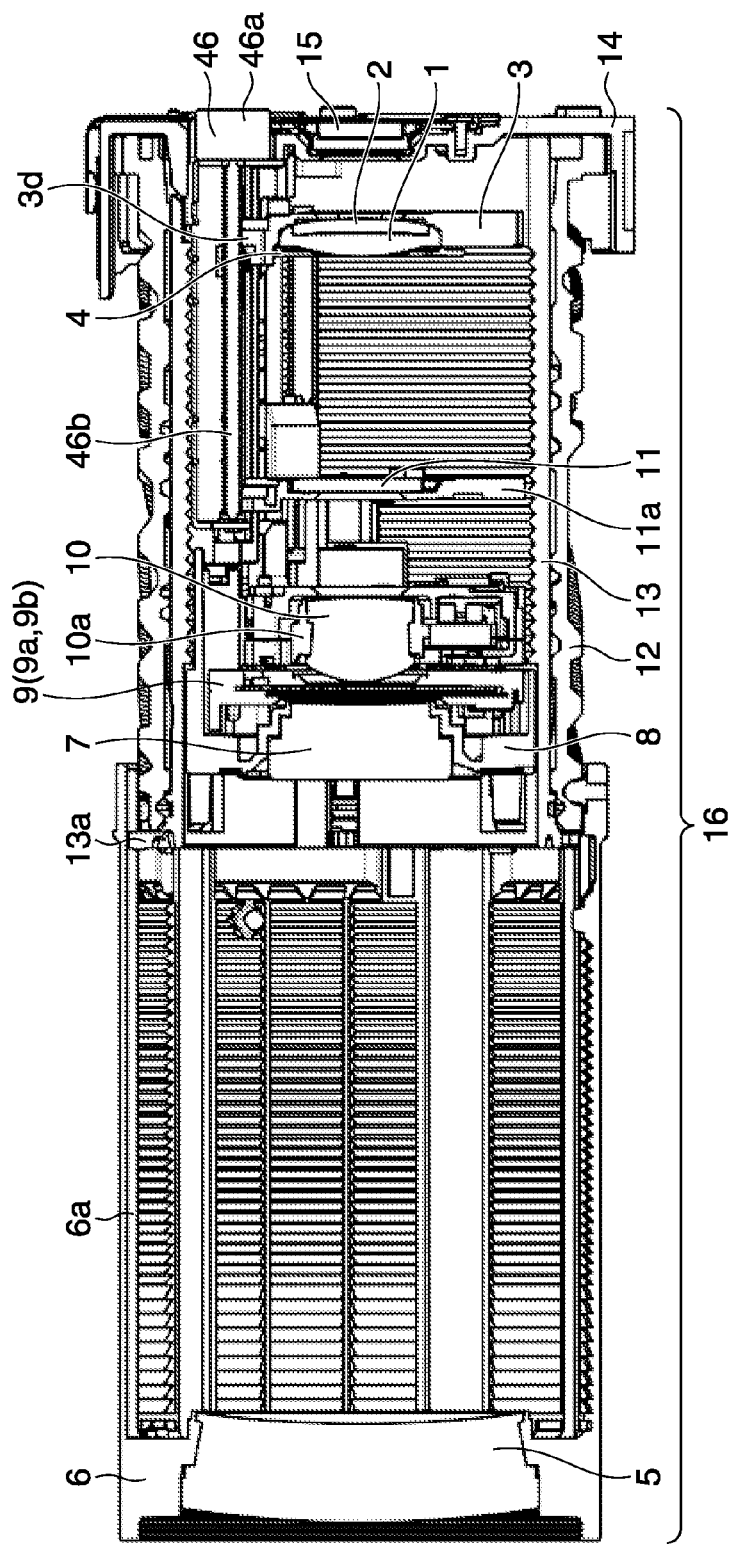
FIG. 4 is a cross-sectional view showing the lens barrel at a shooting position.

Referring next to FIGS. 3 to 8, a detailed description will be given of the lens barrel 16. FIG. 3 is a cross-sectional view showing the lens barrel 16 at the retracted position. FIG. 4 is a cross-sectional view showing the lens barrel 16 at the shooting position.

As shown in FIGS. 3 and 4, the lens barrel 16 has a group-1 barrel 6 which holds group-1 lenses 5. A group-2 lens holder 8 which holds group-2 lenses 7 is disposed on a rear side of the group-1 barrel 6, and a diaphragm shutter 9 comprised of the shutter 9a and the diaphragm 9b configured as an integral unit is disposed on a rear side of the group-2 lens holder 8.

A group-3 lens holder 10a which holds group-3 lenses 10 is disposed on a rear side of the diaphragm shutter 9, and a group-4 lens holder 11a which holds group-4 lenses 11 is disposed on a rear side of the group-3 lens holder 10a.

A group-5 lens holder 3 which holds the focus lens group 1, 2 is disposed on a rear side of the group-4 lens holder 11a, and a device holder 14 which holds the image pickup device 15 is disposed on a rear side of the group-5 lens holder 3.

The focus drive mechanism 46 has a screw shaft 46b which is rotatively driven by a motor 46a, and a rack 3d, which is provided on an outer periphery of the group-5 lens holder 3, and the screw shaft 46b are screwed together. Thus, when the screw shaft 46b is rotatively driven by the motor 46a, the group-5 lens holder 3 moves in a direction of an optical axis integrally with the focus lens group 1, 2 to perform a focusing operation.

A cam barrel 12 is disposed on an outer peripheral side of a fixed barrel 13, and a follower provided on an inner periphery of the group-1 barrel 6 follows a cam groove formed on an outer periphery of the cam barrel 12.

A rectilinear key 13a is provided at an end of the fixed barrel 13 on a front side (object side), and the rectilinear key 13a is engaged with a rectilinear groove 6a formed on an inner periphery of the group-1 barrel 6. Thus, when the cam barrel 12 rotates, the group-1 barrel 6 of which rotation is being inhibited by the rectilinear key 13a moves forward and backward in the direction of the optical axis while the follower on the inner periphery of the group-1 barrel 6 follows the cam groove of the cam barrel 12.

A plurality of cam grooves are formed on an inner periphery of the cam barrel 12, and followers provided in respective ones of the group-2 lens holder 8, the diaphragm shutter 9, the group-3 lens holder 10a, and the group-4 lens holder 11a follow the plurality of cam grooves.

Rotation of the group-2 lens holder 8 is inhibited by the fixed barrel 13, and rotation of the diaphragm shutter 9, the group-3 lens holder 10a, and the group-4 lens holder 11a is inhibited by engaging with a guide bar, not shown, provided on the fixed barrel 13.

Figure 5:
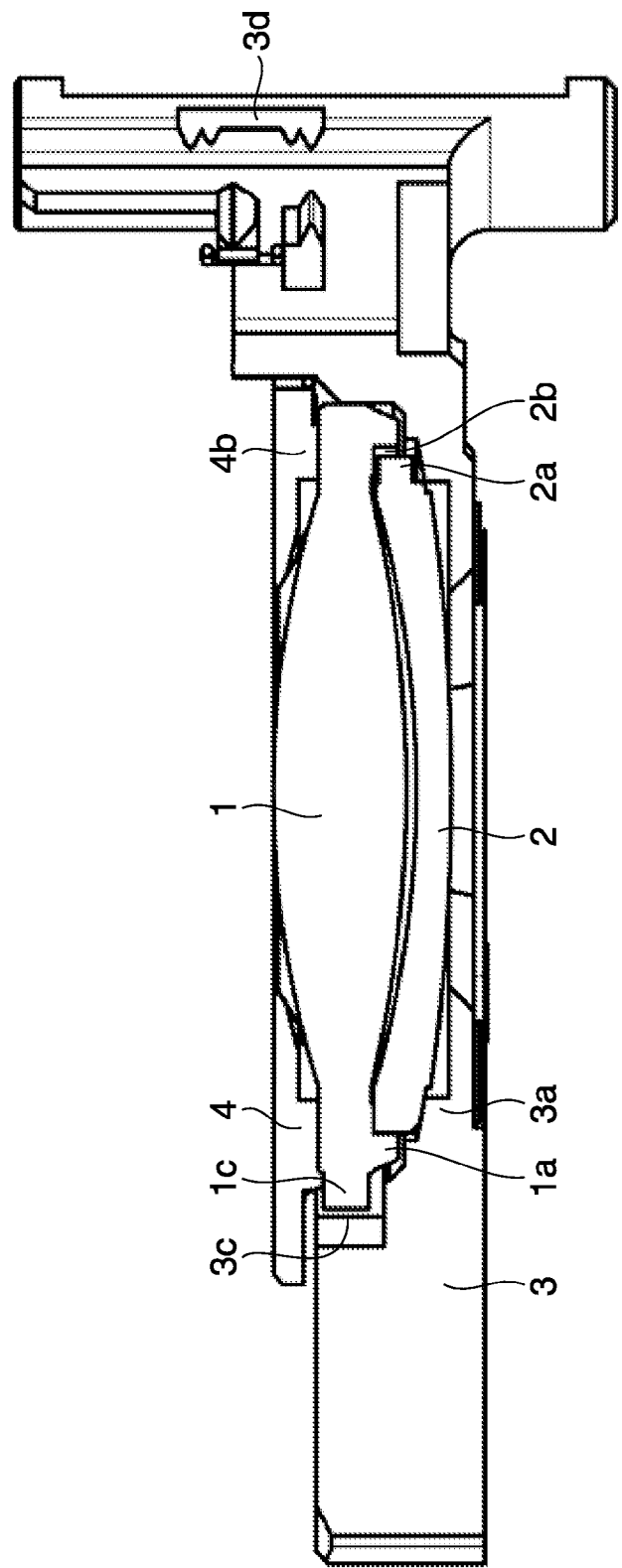
FIG. 5 is a cross-sectional view showing a group-5 lens holder which holds a focus lens group.
Figure 6:
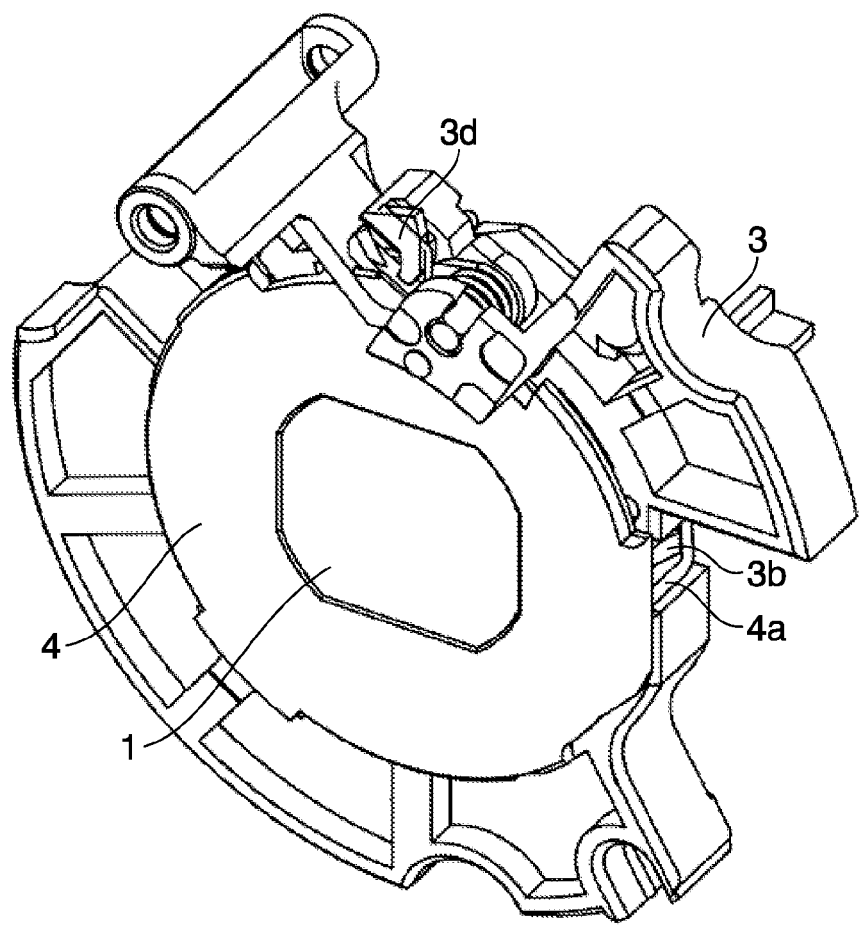
FIG. 6 is a perspective view showing the group-5 lens holder, which holds the focus lens group, as seen from front.
Figure 7:
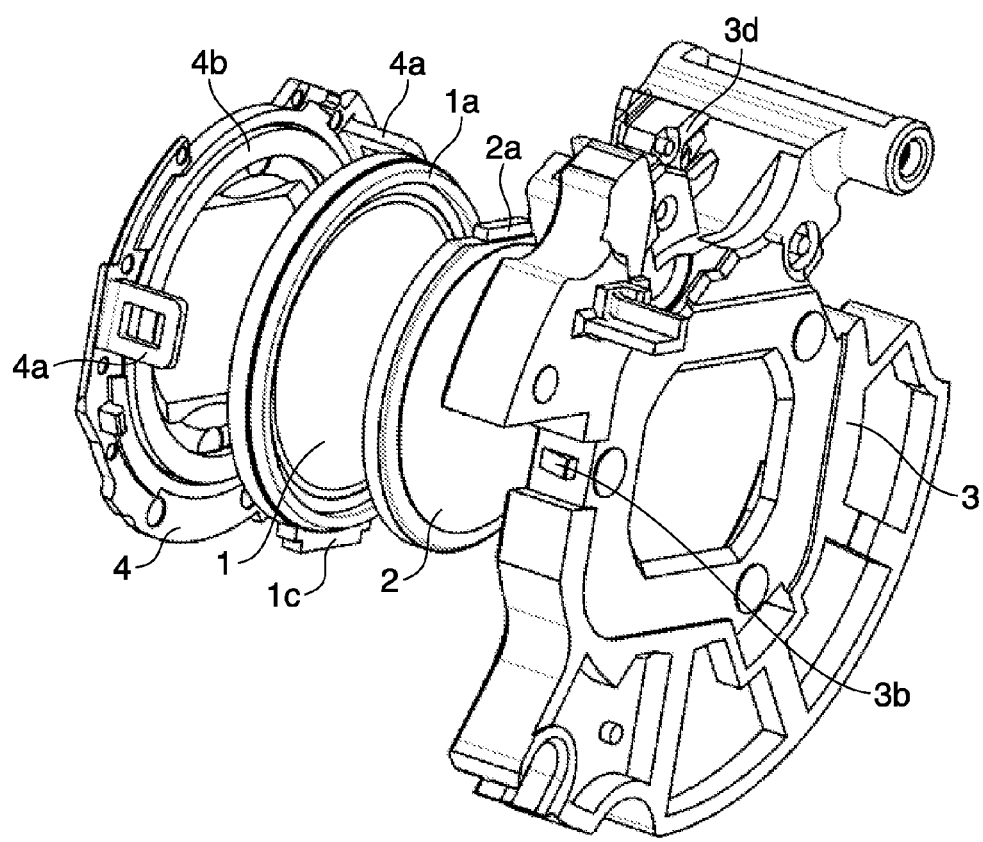
FIG. 7 is an exploded perspective view showing the group-5 lens holder, which holds the focus lens group, as seen from behind.

FIG. 5 is a cross-sectional view showing the group-5 lens holder 3 which holds the focus lens group 1, 2. FIG. 6 is a perspective view showing the group-5 lens holder 3, which holds the focus lens group 1, 2, as seen from front. FIG. 7 is an exploded perspective view showing the group-5 lens holder 3, which holds the focus lens group 1, 2, as seen from behind.

As shown in FIGS. 5 to 7, the focus lens group 1, 2 is comprised of a first lens 1 disposed on a front side (an upper side as viewed in FIG. 5), and a second lens 2 disposed on a rear side of the first lens 1. The first lens 1 and the second lens 2 are each comprised of a molded plastic lens.

On a rear side of the first lens 1, a cylindrical fitting holding portion 1a is provided inside an outer periphery of the first lens 1 in a radial direction and almost coaxially with the first lens 1. The second lens 2 is fitted into an inner periphery of the fitting holding portion 1a of the first lens 1 in the direction of the optical axis. As a result, axes of the first lens 1 and the second lens 2 are aligned with high accuracy.

A fitting concave portion 3a which the second lens 2 of the focus lens group 1, 2 is fitted into from the front in the direction of the optical axis and held in is formed in the group-5 lens holder 3. With the second lens 2 of the focus lens group 1, 2 fitted in the fitting concave portion 3a of the group-5 lens holder 3, the second lens 2 and the first lens 1 are in abutment with each other, and the second lens 2 is held in a state of being sandwiched between the first lens 1 and the fitting concave portion 3a in the direction of the optical axis.

An annular urging member 4 is disposed on a front side of the first lens 1, and an urging portion 4b is formed on a rear surface of the urging member 4. The urging portion 4b urges the first lens 1 as well as the second lens 2 toward the fitting concave portion 3a of the group-5 lens holder 3. At this time, an outer periphery of the first lens 1 is positioned and fitted in an inner periphery of the group-5 lens holder 3.

On an outer periphery of the urging member 4, a plurality of snap fittings 4a projecting rearward are provided at substantially regular intervals in a circumferential direction. The urging member 4 is fixed to the group-5 lens holder 3 by hooking the plurality of snap fittings 4a on respective ones of a plurality of hook projections 3b provided for the group-5 lens holder 3.

As described earlier, the first lens 1 and the second lens 2 are each comprised of a molded plastic lens, and hence gates for molding are required.

In the present embodiment, a gate for use in molding the first lens 1 is disposed on an outer periphery of the first lens 1. Thus, a convex portion 1c corresponding in shape to a remaining part of after molding is provided in a manner projecting outward in a radial direction from a part of the outer periphery of the first lens 1 and housed in a concave portion 3c formed on an inner periphery of the group-5 lens holder 3.

Figure 8:
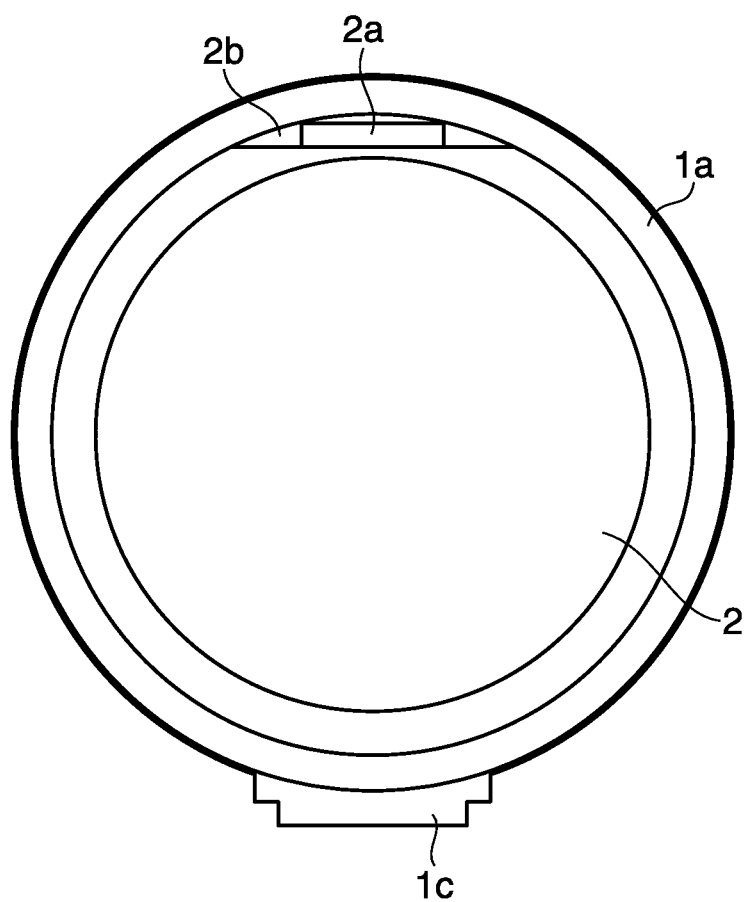
FIG. 8 is a view showing a state in which a second lens is incorporated into a fitting holding portion of a first lens as viewed from a direction of an optical axis.

FIG. 8 is a view showing a state in which the second lens 2 is mounted inside the fitting holding portion 1a of the first lens 1 as seen from the direction of the optical axis.

As shown in FIG. 8, a gate for use in molding the second lens 2 is disposed on a cut surface with a D-cut shape obtained by flatly cutting out a part of an outer periphery of the second lens 2.

A convex portion 2a corresponding in shape to a remaining part of the gate after molding of the second lens 2 is housed in a space 2b formed between an inner peripheral surface of the fitting holding portion 1a of the first lens 1 and the D-cut surface of the second lens 2.

Namely, the gate for the second lens 2 is managed such that the convex portion 2a corresponding in shape to a remaining part of the gate never projects outward in a radial direction from an outer diameter of the second lens 2. This prevents the gate from affecting the radial size and positional accuracy of the second lens 2.

As described above, in the present embodiment, the plurality of plastic lenses 1 and 2 which are small, easy to assemble, and inexpensive are efficiently combined together and held with high accuracy without the need to increasing the outer diameter of the lens barrel 16.

Figure 9:
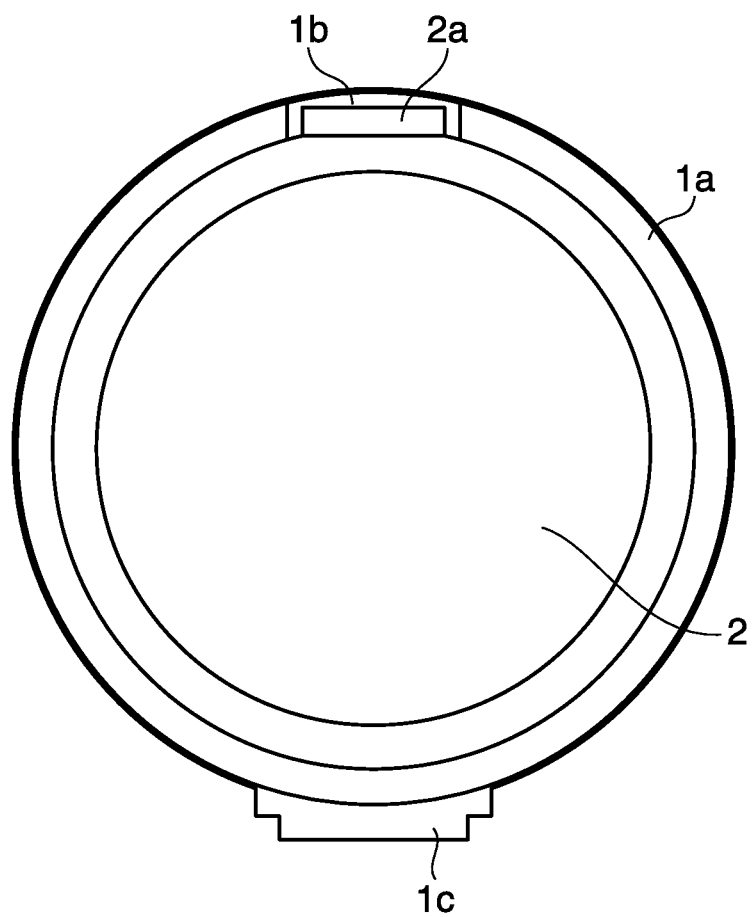
FIG. 9 is a view showing a state in which a second lens is incorporated into a fitting holding portion of a first lens as viewed from a direction of an optical axis in a digital camera which is a second embodiment of the optical device equipped with the lens barrel which is the exemplary lens unit according to the invention.

Referring next to FIG. 9, a description will be given of a digital camera which is a second embodiment of the optical device equipped with the lens barrel which is the exemplary lens unit according to the invention. It should be noted that parts overlapping or corresponding to those of the first embodiment described above are designated by the same reference symbols in the figure, and description thereof is omitted.

FIG. 9 is a view showing a state in which the second lens 2 is mounted inside the fitting holding portion 1a of the first lens 1 as seen from the direction of the optical axis.

In the present embodiment, as shown in FIG. 9, no D-cut surface is formed on an outer periphery of the second lens 2, and a gate for use in molding the second lens 2 is disposed on an outer periphery of the second lens 2. Thus, a convex portion 2a corresponding in shape to a remaining part of the gate after molding of the second lens 2 is provided in a manner projecting outward in a radial direction from the outer periphery of the second lens 2.

The convex portion 2a of the second lens 2 is inserted into a cutout portion 1b formed in a peripheral wall of the fitting holding portion 1a so as not to project outward in a radial direction from an outer periphery of the first lens 1. This prevents the gate from affecting the radial size and positional accuracy of the second lens 2. The other constitution and operational advantages are the same as those of the first embodiment described above.

Figure 10:
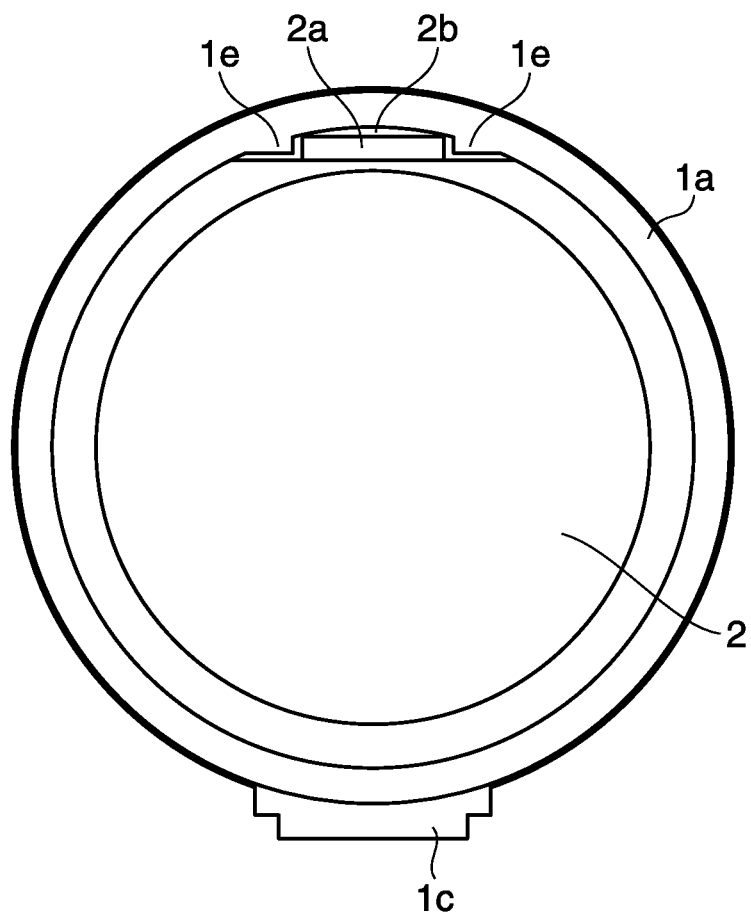
FIG. 10 is a view showing a state in which a second lens is incorporated into a fitting holding portion of a first lens as viewed from a direction of an optical axis in a digital camera which is a third embodiment of the optical device equipped with the lens barrel which is the exemplary lens unit according to the invention.

Referring next to FIG. 10, a description will be given of a digital camera which is a third embodiment of the optical device equipped with the lens barrel which is the exemplary lens unit according to the invention. It should be noted that parts overlapping or corresponding to those of the first embodiment described above are designated by the same reference symbols in the figure, and description thereof is omitted.

FIG. 10 is a view showing a state in which the second lens 2 is mounted inside the fitting holding portion 1a of the first lens 1 as seen from the direction of the optical axis.

In the present embodiment, as shown in FIG. 10, a gate for use in molding the second lens 2 is disposed on a cut surface with a D-cut shape obtained by flatly cutting out a part of an outer peripheral portion of the second lens 2 as with the first embodiment described above.

A convex portion 2a corresponding in shape to a remaining part of the gate after molding of the second lens 2 is housed in the space 2b formed between the inner peripheral surface of the fitting holding portion 1a of the first lens 1 and the D-cut surface of the second lens 2.

On an inner periphery of the fitting holding portion 1a, rotation inhibiting projections 1e that inhibit rotation of the second lens 2 with respect to the first lens 1 are provided at positions on both sides of the convex portion 2a of the second lens 2 in a circumferential direction. By thus inhibiting rotation of the second lens 2 with respect to the first lens 1, the phase accuracy of the first lens 1 and the second lens 2 is stably secured. The other constitution and operational advantages are the same as those of the first embodiment described above.

OTHER EMBODIMENTS

Embodiment(s) of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-236350, filed Nov. 21, 2014, which is hereby incorporated by reference herein in its entirety.

What is claimed is:

1. A lens unit comprising:
a first lens configured to be made of plastic;
a second lens configured to be fitted onto and held on a rear side of said first lens in a direction of an optical axis and made of plastic; and
a lens holder configured to be disposed on a rear side of said second lens and hold said second lens,
wherein said second lens is positioned with respect to said first lens in the direction of the optical axis and a direction perpendicular to the optical axis by fitting said second lens into a fitting holding portion of said first lens,
wherein a projection portion corresponding in shape to a part of a gate after molding of said second lens is disposed in a space between an inner peripheral surface of the fitting holding portion and a cut surface formed by cutting out a part of an outer periphery of said second lens, and
wherein as viewed from the direction perpendicular to the optical axis, the fitting holding portion and the projection portion of said second lens overlaps in the direction perpendicular to the optical axis.

2. The lens unit according to claim 1, wherein, on an inner periphery of the fitting holding portion, rotation inhibiting projections that inhibit rotation of said second lens with respect to said first lens are provided at positions on both sides of the projection portion of said second lens in a circumferential direction.

3. The lens unit according to claim 1, wherein an urging member that urges said first lens as well as said second lens toward said lens holder is provided on a front side of said first lens, and the urging member is fixed to said lens holder.

4. A lens unit comprising:
a first lens configured to be made of plastic;
a second lens configured to be fitted and held on a rear side of said first lens in a direction of an optical axis and made of plastic; and
a lens holder configured to be disposed on a rear side of said second lens and hold said second lens,
wherein said second lens is positioned with respect to said first lens in the direction of the optical axis and a direction perpendicular to the optical axis by fitting the second lens into a fitting holding portion of said first lens,
wherein a projection portion corresponding in shape to a part of a gate after molding of said second lens is inserted into a cutout portion formed in a peripheral wall of the fitting holding portion, and
wherein as viewed from the direction perpendicular to the optical axis, the fitting holding portion and the projection portion of said second lens overlaps in the direction perpendicular to the optical axis.

5. The lens unit according to claim 4, wherein the projection portion is inserted into the cutout portion so as not to project outward in a radial direction from an outer periphery of said first lens.

6. The lens unit according to claim 4, wherein an urging member that urges said first lens as well as said second lens toward said lens holder is provided on a front side of said first lens, and the urging member is fixed to said lens holder.

7. An optical device comprising:
a lens unit having a first lens made of plastic, a second lens fitted and held on a rear side of the first lens in a direction of an optical axis and made of plastic, and a lens holder disposed on a rear side of the second lens and holding the second lens,
wherein said second lens is positioned with respect to said first lens in the direction of the optical axis and a direction perpendicular to the optical axis by fitting said second lens into a fitting holding portion of said first lens,
wherein a projection portion corresponding in shape to a part of a gate after molding of the second lens is disposed in a space between an inner peripheral surface of the fitting holding portion and a cut surface formed by cutting out a part of an outer periphery of said second lens, and
wherein as viewed from the direction perpendicular to the optical axis, the fitting holding portion and the projection portion of said second lens overlaps in the direction perpendicular to the optical axis.

8. An optical device comprising: a lens unit having a first lens made of plastic, a second lens fitted and held on a rear side of the first lens in a direction of an optical axis and made of plastic, and a lens holder disposed on a rear side of the second lens and holding the second lens,
wherein said second lens is positioned with respect to said first lens in the direction of the optical axis and a direction perpendicular to the optical axis by fitting the second lens into a fitting holding portion of said first lens,
wherein a projection portion corresponding in shape to a part of a gate after molding of the second lens is inserted into a cutout portion formed in a peripheral wall of the fitting holding portion, and
wherein as viewed from the direction perpendicular to the optical axis, the fitting holding portion and the projection portion of said second lens overlaps in the direction perpendicular to the optical axis.

* * * * *